US011070360B2

(12) United States Patent
Tong et al.

(10) Patent No.: US 11,070,360 B2
(45) Date of Patent: Jul. 20, 2021

(54) PARALLEL TRANSACTION VALIDATION AND BLOCK GENERATION IN A BLOCKCHAIN

(71) Applicant: International Business Machines Corporation, Armonk, NY (US)

(72) Inventors: Yue Tong, Beijing (CN); Miao He, Beijing (CN); Bing Shao, Beijing (CN); Changrui Ren, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 16/101,708

(22) Filed: Aug. 13, 2018

(65) Prior Publication Data

US 2020/0052884 A1    Feb. 13, 2020

(51) Int. Cl.
| | | |
|---|---|---|
| *H04L 9/00* | (2006.01) | |
| *H04L 9/06* | (2006.01) | |
| *H04L 9/32* | (2006.01) | |
| *H04L 29/08* | (2006.01) | |

(52) U.S. Cl.
CPC .......... *H04L 9/0637* (2013.01); *H04L 9/3239* (2013.01); *H04L 9/3247* (2013.01); *H04L 67/104* (2013.01); *H04L 2209/38* (2013.01)

(58) Field of Classification Search
CPC .................................................. H04L 9/0637
USPC ....................................................... 713/150
See application file for complete search history.

(56) References Cited

U.S. PATENT DOCUMENTS

| | | | |
|---|---|---|---|
| 9,608,829 B2 | 3/2017 | Spanos et al. | |
| 2017/0075941 A1 | 3/2017 | Finlow-Bates | |
| 2017/0103468 A1 | 4/2017 | Orsini et al. | |
| 2017/0212781 A1 | 7/2017 | Dillenberger et al. | |
| 2018/0276626 A1* | 9/2018 | Laiben | G06Q 20/02 |
| 2018/0294955 A1* | 10/2018 | Rhie | H04L 9/0637 |
| 2019/0012695 A1* | 1/2019 | Bishnoi | G06Q 20/223 |
| 2019/0073666 A1* | 3/2019 | Ortiz | G06F 21/62 |
| 2019/0279210 A1* | 9/2019 | Pen | G06Q 20/223 |

OTHER PUBLICATIONS

Cheng Li, and Liang-Jie Zhang, "A Blockchain Based New Secure Multi-Layer Network Model for Internet of Things," 2017 IEEE International Congress on Internet of Things (ICIOT), Year: 2017, pp. 33-41.

Zabela Moise, "Efficient Agreement Protocols in Asynchronous Distributed Systems," Parallel and Distributed Processing Workshops and PHD Forum (IPDPSW), 2011 IEEE International Symposium on, IEEE, May 16, 2011 (May 16, 2011), pp. 2022-2025.

(Continued)

*Primary Examiner* — Christopher J Brown

(57) ABSTRACT

An example operation may include one or more of identifying pending blockchain transactions in a transaction queue, determining states of the pending blockchain transactions, determining whether the pending blockchain transactions in the transaction queue are valid based on the determined states, retrieving a list of potential blockchain transaction conflicts associated with the pending blockchain transactions, and determining whether any conflicts exist for one or more of the pending blockchain transactions based on the list of blockchain transaction conflicts.

20 Claims, 14 Drawing Sheets

(56) References Cited

OTHER PUBLICATIONS

Trent McConaghy, Rodolphe Marques, Andreas Muller, Dimitri De Jonghe, Troy Mcconaghy, Greg McMullen, Ryan Henderson, Sylvain Bellemare, and Alberto Granzotto, "BigchainDB: A Scalable Blockchain Database," (2016). Retrieved from the Internet using: https://pdfs.semanticscholar.org/1c0c/5640e2efcd32480f94020bf857c261acdae4.pdf.

Xinping Min, Qingzhong L, Lei Liu, and Lizhen Cui, "A Permissioned Blockchain Framework for Supporting Instant Transaction and Dynamic Block Size," 2016 IEEE Trustcom/BigDataSE/ISPA, Year: 2016, pp. 90-96.

* cited by examiner

100D

PARALLEL TRANSACTION VALIDATION AND BLOCK GENERATION IN A BLOCKCHAIN

TECHNICAL FIELD

This application generally relates to transaction and block validation in a blockchain, and more specifically to monitoring transactions and block creation to identify the potential for processing blockchain transactions and blocks in parallel.

BACKGROUND

A ledger is commonly defined as an account book of final entry, in which transactions are recorded. Ledgers can be stored on paper or electronically on a computer. A distributed ledger is ledger that is replicated in whole or in part to multiple computers cryptographic distributed ledger (CDL): can have at least some of these properties: irreversibility—once a transaction is recorded, it cannot be reversed accessibility—any party can access the CDL in whole or in part chronological and time-stamped: all parties know when a transaction was added to the ledger consensus based: a transaction is added only if it is approved, typically unanimously, by parties on the network verifiability—all transactions can be cryptographically verified. A blockchain is an example of a CDL. While the description and figures below are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in a blockchain's blocks, which are secured from tampering and revision due to their immutable properties. Each block contains a timestamp and a link to a previous block. A blockchain can be used to hold, track, transfer and verify information. Since a blockchain is a distributed system, before adding a transaction to a blockchain ledger, all peers need to reach a consensus status.

Each block in a blockchain contains a Merkle tree root of several valid blockchain transactions. Transactions cannot be altered after a record is created in a blockchain. Each block contains a hash of a previous block and the previous blocks cannot be altered. When generating a block, blockchain transactions may begin queueing and must pass a validation test by designated validators prior to be assigned to a block of transactions and committed to a blockchain. If a transaction(s) is deemed invalid, it will be disregarded. A block maker entity may calculate the Merkle tree of the valid transactions and create a block. Transaction validation may have large computational costs. If multiple transaction validators are used, then the transaction validation process may be accelerated and system throughput may increase. However, when transactions are processed in parallel, the likelihood of transaction conflicts may also increase, which can create inconsistencies in a blockchain.

SUMMARY

One example embodiment may provide a method that includes one or more of identifying a plurality of pending blockchain transactions in a transaction queue, determining states of the plurality of pending blockchain transactions, determining whether the plurality of pending blockchain transactions in the transaction queue are valid based on the determined states, retrieving a list of potential blockchain transaction conflicts associated with the plurality of pending blockchain transactions, and determining whether any conflicts exist for one or more of the plurality of pending blockchain transactions based on the list of blockchain transaction conflicts.

Another example embodiment includes a system with a blockchain database, and a computing node configured to identify a plurality of pending blockchain transactions in a transaction queue, determine states of the plurality of pending blockchain transactions, determine whether the plurality of pending blockchain transactions in the transaction queue are valid based on the determined states, retrieve a list of potential blockchain transaction conflicts associated with the plurality of pending blockchain transactions, and determine whether any conflicts exist for one or more of the plurality of pending blockchain transactions based on the list of blockchain transaction conflicts.

Still another example embodiment may include a non-transitory computer readable storage medium configured to store instructions that when executed cause a processor to perform one or more of identifying a plurality of pending blockchain transactions in a transaction queue, determining states of the plurality of pending blockchain transactions, determining whether the plurality of pending blockchain transactions in the transaction queue are valid based on the determined states, retrieving a list of potential blockchain transaction conflicts associated with the plurality of pending blockchain transactions, and determining whether any conflicts exist for one or more of the plurality of pending blockchain transactions based on the list of blockchain transaction conflicts.

DETAILED DESCRIPTION

Figure 1A:
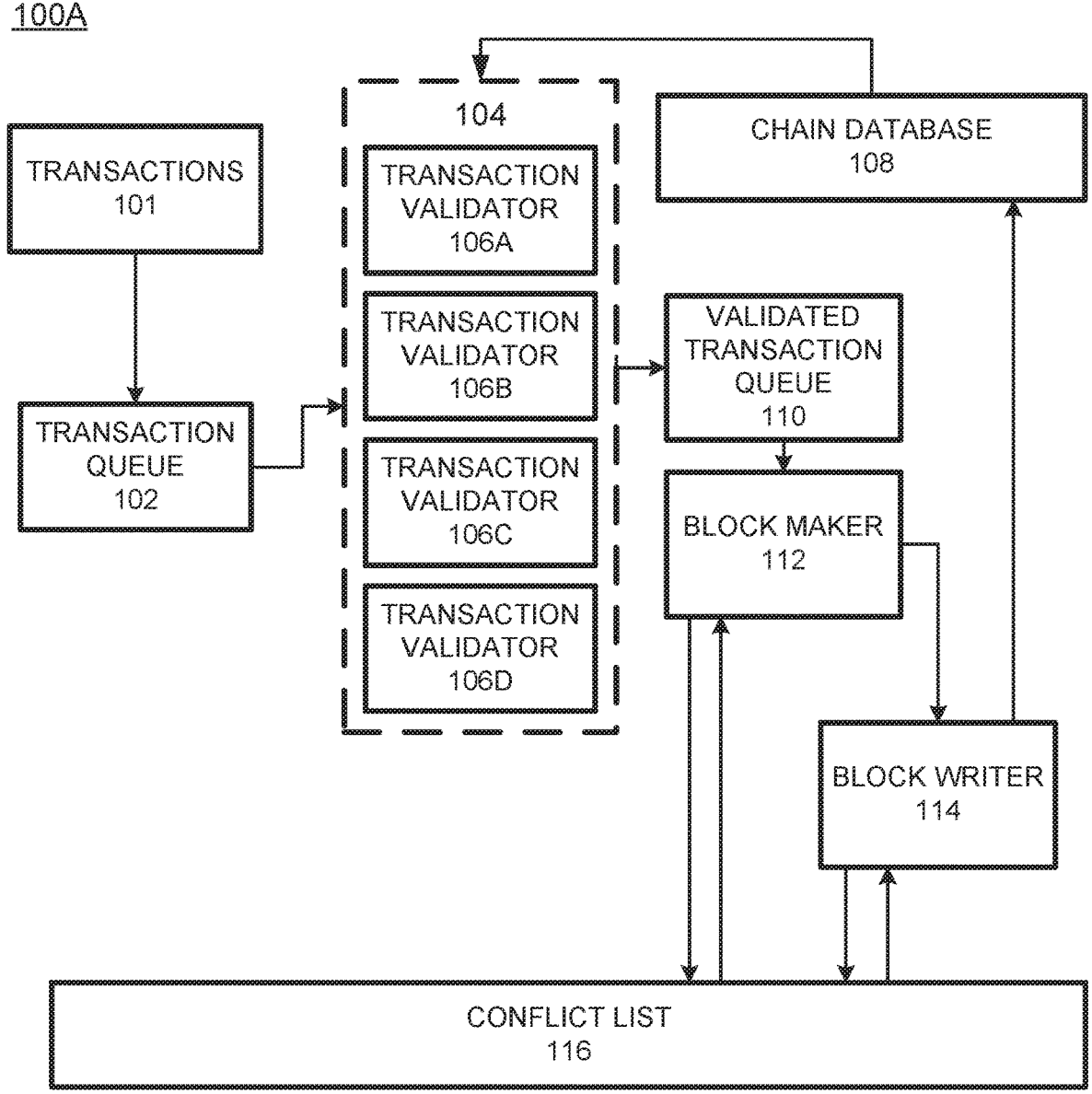
FIG. 1A illustrates a logic diagram of a blockchain transaction management configuration, according to example embodiments.

It will be readily understood that the instant components, as generally described and illustrated in the figures herein, may be arranged and designed in a wide variety of different configurations. Thus, the detailed description of the embodiments of at least one of a method, an apparatus, a non-transitory computer readable medium and a system, as represented in the associated figures and description, is not intended to limit the scope of the application but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of messages or network data, such as, packet, frame, datagram, etc. Furthermore, while certain types of messages, signaling and protocols may be depicted in exemplary embodiments they are not limited to a certain type of message, signaling or protocol.

Example embodiments provide methods, devices, networks and/or systems, which support a blockchain distributed system with selective peer management procedures. A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

Before submitting any blockchain transaction into a block, the transaction must be identified as valid, (i.e., it can be executed according to the current state recorded by the blockchain). In one example, a transaction may transfer a result from account A to account B and is defined as valid if account A has a balance greater or equal to a certain balance as recorded by a blockchain state. Otherwise, if account A has less than that balance, the transaction cannot be executed. For other kinds of transactions, the requirements of a valid transaction can be different according to the purpose of the transaction. In a more complicated situation with two transactions identified in parallel, there may be two transaction validators, and each of them checks one transaction at the same time, for instance, transaction validator one checks transaction one and transaction validator two checks transaction two at the same time.

In an example of a current blockchain state, account A has balance X, account B has balance Y, account C has balance Z and transaction one transfers W from account A to account B, then transaction two transfers U from account A to account B. If the transactions one and two are checked parallelly at the same time, both transactions are deemed valid when $X>=Y$ and $X>=U$. However, both transactions cannot be placed into the blockchain since the sum is >balance X. As a result, transaction one and transaction two may have a conflict, which means, executing transaction one may affect the judgement of validity of transaction two. Generally, for two transactions, there are three situations:

situation 1: executing transaction one will not affect the validity of transaction two, situation 2: executing transaction one will affect the validity of transaction two, and the validity of transaction two must be re-checked, and situation three: executing transaction one will definitely cause transaction two to be invalid. In this example, transaction one and transaction two are part of situation 2.

In another transaction example, transaction three may be to: transfer W from account C to account B, now transaction one and transaction three are like situation 1. Since most of the computational time is spent on transaction validation when generating a block, parallel validation can speed-up the block generation. However, if many transactions are checked (e.g., 1000 transactions) in parallel, and then put into the blockchain, then in order to ensure that all the conflicts of the transactions are correctly identified, a "conflict table" may be used to resolve the potential for conflicts.

In example embodiments, when a transaction validator checks a transaction TX (in parallel), it outputs three sets: items set (I), permanent conflict set (P), and temporary conflict set (T). Those sets can be used to identify which situation the two transactions are likely to be identified with for purposes of transaction management. If one transaction's P set and another transaction's I set have any common items, they are part of situation 3. If one transaction's T set and another transaction's I set have any common items, they are part of situation 2. Otherwise, the transactions are part of situation 1. Using this approach, the transaction validation process can be performed in parallel. The situation that two transaction validators permit two conflicting transactions at the same time will not be an issue since the validators can check their I sets, P sets and T sets to avoid this situation. For all the transactions that have been validated but have not been written into the blockchain, a conflict list is maintained that contains all the transactions' I sets. After a new transaction TX has been checked to be valid, based on the current state of the blockchain, the transaction validator will check if the TX's P set and T set have any common items within the conflict list. For example, if TX's P set has any items with the conflict list, the TX will be considered a PERMANENT_FAIL, If the TX's P set has any items with the conflict list, the TX will be considered a TEMPORARY_FAIL, and if the TX's P and T set have no common items within the conflict list, the TX will be considered a SUCCESS. The state PERMANENT_FAIL provides that the transaction has an absolute conflict (situation 3) with one or more existing valid transactions and will be denied. The state TEMPORARY_FAIL indicates the transaction has potential conflicts (situation 2) with existing valid transactions and the transaction must be checked again later.

Continuing with the transfer example. Since a transaction is valid if it can be executed, a transfer transaction is valid if the account has enough balance. For a transfer transaction "transfer amount from account one to account two", the conflict table can be defined as: Items set (I): account_y, permanent conflict set (P): empty temporary conflict set (T): account_y. This indicates that if another transaction also transfers an amount from account y at the same time when this transaction is being verified, this transaction must be re-checked (re-verified), and, no situations will cause this transaction to be invalid for sure. For example, a current state: account A has X, account B has Y, account C has Z, then transaction one: transfer W from account A to account B, I set: account_A, P set: empty, T set: account_A, transaction two: transfer U from account_A to account B, I set: account_A, P set: empty, T set: account_A, and transaction three: transfer U from account C to account B, I set: account_C, P set: empty, T set: account_C. In this scenario, transaction one and transaction two fall in situation 2 (have a potential conflict and must be re-checked) because transaction one's I set and transaction two's T set have a common item 'account_A'. Also, transaction one and transaction three are in situation 1 (no need to be re-checked) because transaction one's I set and transaction three's T set have no common items (vice versa).

For different kinds of transactions, the I set, P set and T set can be defined according to the nature of the transaction. In another example, a single-transfer based transfer, if two transactions have the same amount, only one of them can be executed. For such transfer transactions "spend x1, x2, . . . , and output y1, y2, . . . ", the conflict table can be defined as: items set (I): x1, x2, . . . , with a permanent conflict set (P): x1, x2, . . . , and a temporary conflict set (T): empty. This implies that if another transaction has already performed the same transfer amount then this transaction can be considered invalid.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Example embodiments provide a method, device, computer readable medium, and system for parallel transaction validation and block generation in a blockchain. In one example, blockchain transactions are organized into a transaction validator module, and the valid transactions are placed in a 'block maker' module so the accumulate transactions can be used to generate a new block. Transaction validation costs can be costly, since checking work, checking signatures, checking account balances, etc., may be necessary in blockchain validation efforts. Using multiple transaction validators can optimize the amount of time required to process transactions. However, in the possibility that two conflicting transactions, e.g., double-spending transactions, can both pass validation, since they are processed at about the same time by different validators, a specific filter/audit process must be adhered to in order to avoid such failures.

One approach is to introduce a conflict list, which is a list that contains transaction conflict information of all transactions that have passed the validation but have not yet been placed into the chain database. The chain database represents a blockchain and its states, such as blocks, transactions, etc. When a blockchain is stored on a server's memory, the blockchain may be wholly included in the chain database, which may be a relational database or other type of database. The conflict list is shared by all validator entities/modules. The conflict table may include three sets of categories for transactions, items 'I', permanent conflict set 'P', and temporary conflict set 'T'. In this example, if a transaction TX1 is accepted, then ITEM1 and ITEM2 may be placed into the conflict list for other transactions to identify conflicts. If another transaction TX2 has ITEM1 in its P set, the transaction TX2 is deemed invalid, and if another transaction TX3 has ITEM1 in its T set. It must be verified later since about those additional conflicts at this point in time.

Continuing with the same example, ITEM1 can be removed from the conflict list if TX1 has been put into a block, and the block has been put into the blockchain. After that, the validators can use the chain database to identify the conflict (e.g., the account balance in has been updated). The read and write of the conflict table is fast since it is small and can be cached in memory. One example of a conflict table is that which is used with an asset transaction blockchain. In the asset example, the validation of all 'ASSET TRANSACTIONS', which have ASSET_TX in their 'I' sets, are suspended until the configuration transaction is placed into the chain database. The conflict table may be used to validate transactions in parallel. Multiple transaction validators and one block maker and all other components in the system may work together to generate the correct block using such a conflict checking approach.

FIG. 1A illustrates a logic diagram of a blockchain transaction management configuration, according to example embodiments. Referring to FIG. 1A, the configuration 100A may include a set of transactions 101 which need to be reviewed and committed to a block and the blockchain. As the transactions arrive for review, the transactions 101 are stored in a transaction queue 102. A set of transaction validators 104 may offer a pool of potential validators, in this example, four validators 106A-106D, which may operate in parallel and are configured to validate transactions at the same time. The transactions are pulled from the queue 102 and a first validator 106A may check if the transaction is valid based on the transaction's state in the chain database 108 and compares the transaction state to the conflict table to identify it the transaction is valid. If the present transaction does not have a conflict with the current conflict list 116 of conflicts, then the managing validator assigned to that transaction updates the conflict list 116 with the conflict table and places the transaction and its conflict table into a queue of validated transactions 110. The block maker 112 will add the current transaction to the current blockchain (i.e., Merkle tree) ledger. When a block needs to be generated, the block maker 112 generates a new block and passes the block to the block writer 114, which writes the block to the chain database 108. Any items in the conflict list 116 which are no longer valid are then removed in a conflict list update procedure.

When a block writer receives a new block and a set of conflict tables CTS. The block writer begins to determine if some new block(s) have been generated and these blocks have not been written to the chain database. The block writer gets the lock, writes the block to chain database and the block writer writes the new block to the chain database. This step will update the blockchain height, since it is necessary to prevent the block writer from updating the blockchain height when transaction validators are reading the height, and thus a lock is used. Also, the conflict list should be consistent with the current block height, so the lock is released after the conflict list is updated. To update the conflict list, since the conflict list contains the I set of all the transactions that have been checked valid but have not been written into the chain database, after the chain database updates, the conflict list should be updated to remove certain items from the conflict list. Let 'h' denote the height of the block, and $D(h):=\{i|i \in C.I \text{ and } C \in CTS\}$. The D(h) is the block h's items that have been added to the conflict list. After the block 'h' has been written to the chain database, these items can be deleted from the conflict list. Before D(h) is removed from the conflict list, a check is performed to determine whether no transaction validators need those block items. Since a transaction validator requires that the conflict list contains all the items with block height>v[k], only the items that are smaller or equal than all the v[k] can be removed (.i.e., Let $u:=\min\{v[k] \; k=1, 2, \ldots\}$, for each $h \leq u$, remove D(h) from conflict list). Then, the lock can be released and the next block is anticipated.

A conflict table may include items (I) in a first row, such as 'ITEM1', 'ITEM2', etc., the contents of the items row may be used to identify conflicts. A second row may be those items which are deemed to have permanent conflicts (P), and if the current conflict list contains any items which are labeled "P" then that transaction is permanently invalidated. Another row of the table may be temporary conflicts "T". If the current conflict list contains any items in "T", this transaction is labeled to be checked again later as the conflict may no longer exist at a later time.

A conflict table validation procedure may provide setting the conflict list 'Q' to empty. Then, when a transaction and its conflict table C is added, if C.P and Q have one or more common items, then return a permanent fail, since permanent conflicts are not resolvable. However, if C.T and Q have one or more common items, then return a temporary fail, which indicates another chance to pass is possible, at a later time. Next, all items in the conflict table (C=conflict table, I=items, T=temporary, P=permanent) C.I are added to the list Q and a 'validation pass' is returned. This process may continue with more and more transactions being continuously added to the conflict table and certain items being removed from 'Q' after the corresponding transactions are written to the chain database.

Figure 1B:
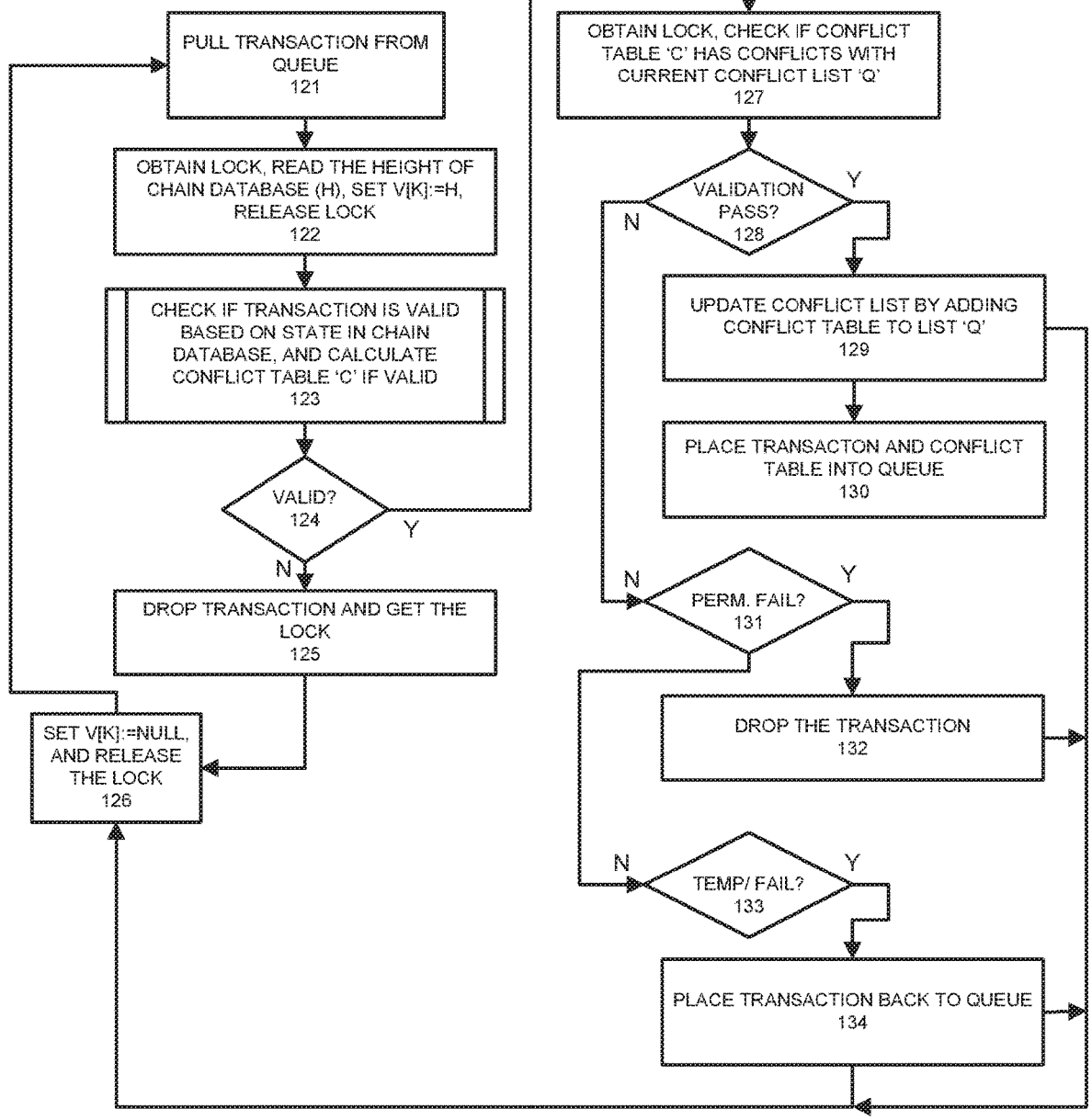
FIG. 1B illustrates a logic flow diagram of a blockchain transaction management configuration of a transaction validator, according to example embodiments.

FIG. 1B illustrates a logic flow diagram of a blockchain transaction management configuration of a transaction validator, according to example embodiments. Referring to FIG. 1B, the flow diagram 100B includes pulling a transaction from the queue 121, this is performed by the transaction validator 104. Multiple transactions may be processed in parallel via the various validators 106A-106D. The validator obtains a lock and reads the height of the chain database denoted H and sets v[K]:=H and then releases the lock 122. A check is performed to determine if the transaction is valid based on the state in the chain database 123. If not 124, then the transaction is dropped and the lock is obtained 125. The value of v[K] is set to null and the lock is released 126 and the next transaction is pulled. If the transaction is valid, a lock is obtained 127 and a check is performed to make sure the conflict table C has or does not have conflicts with the current conflict list Q. If the validation passes 128, the conflict list is updated by adding the conflict table to the list Q 129. A transaction is placed along with the conflict table in the queue 130. If the validation fails, a decision is made as to whether the failure is temporary 133 or permanent 131.

The transaction will either be dropped 132 or placed back in the queue 134 for additional processing at a later time.

The 'lock' is a technique that prevents two threads (or processes) accessing the same data simultaneously. When one thread (thread 1) gets the lock, it can read or write data. When another thread (thread 2) tries to get the same lock, it will have to wait until thread 1 releases the lock. After thread 1 releases the lock, thread 2 can get the lock and read or write the data. The lock is used to prevent the block writer from updating the blockchain height when transaction validators are reading the blockchain height.

Figure 1C:
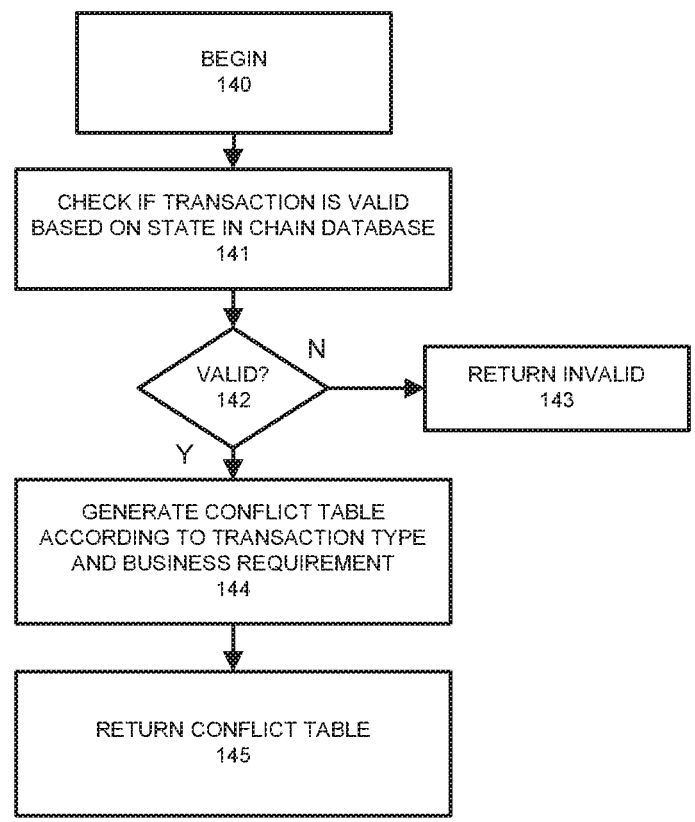
FIG. 1C illustrates another logic flow diagram of a blockchain transaction management configuration of a transaction validator, according to example embodiments.

FIG. 1C illustrates another logic flow diagram of a blockchain transaction management configuration of a transaction validator, according to example embodiments. Referring to FIG. 1C, in this example 100C, the process begins 140 with the transaction validation and conflict table generation. The validator may check if the transaction is valid based on the state in the chain database 141. If not, the transaction is returned 143, if so, the valid transaction 142 generates a conflict table according to the transaction type and business requirement 144 and the conflict table is returned 145.

Figure 1D:
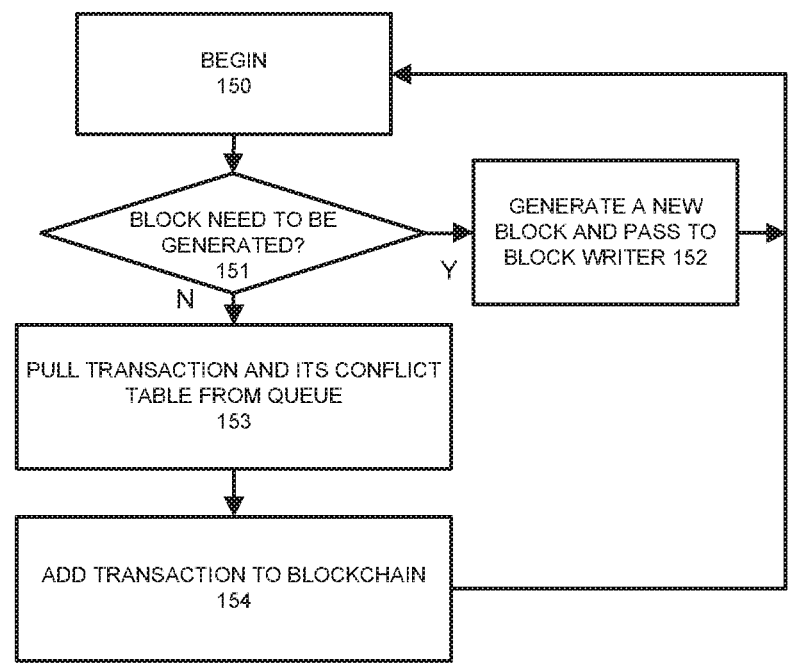
FIG. 1D illustrates yet another logic flow diagram of a blockchain transaction management configuration of a block maker, according to example embodiments.

FIG. 1D illustrates yet another logic flow diagram of a blockchain transaction management configuration of a block maker, according to example embodiments. Referring to FIG. 1D, the example 100D provides beginning a process 150 where a determination is made as to whether a block should be generated 151. The block may be generated and passed to the block writer 152. The process may provide creating the block and passing the block with the conflict tables of all transactions in the block to the block writer. If no block needs to be generated, the transaction is pulled and a conflict table is also pulled from the queue 153. The block maker then adds the transaction to the blockchain 154.

Figure 1E:
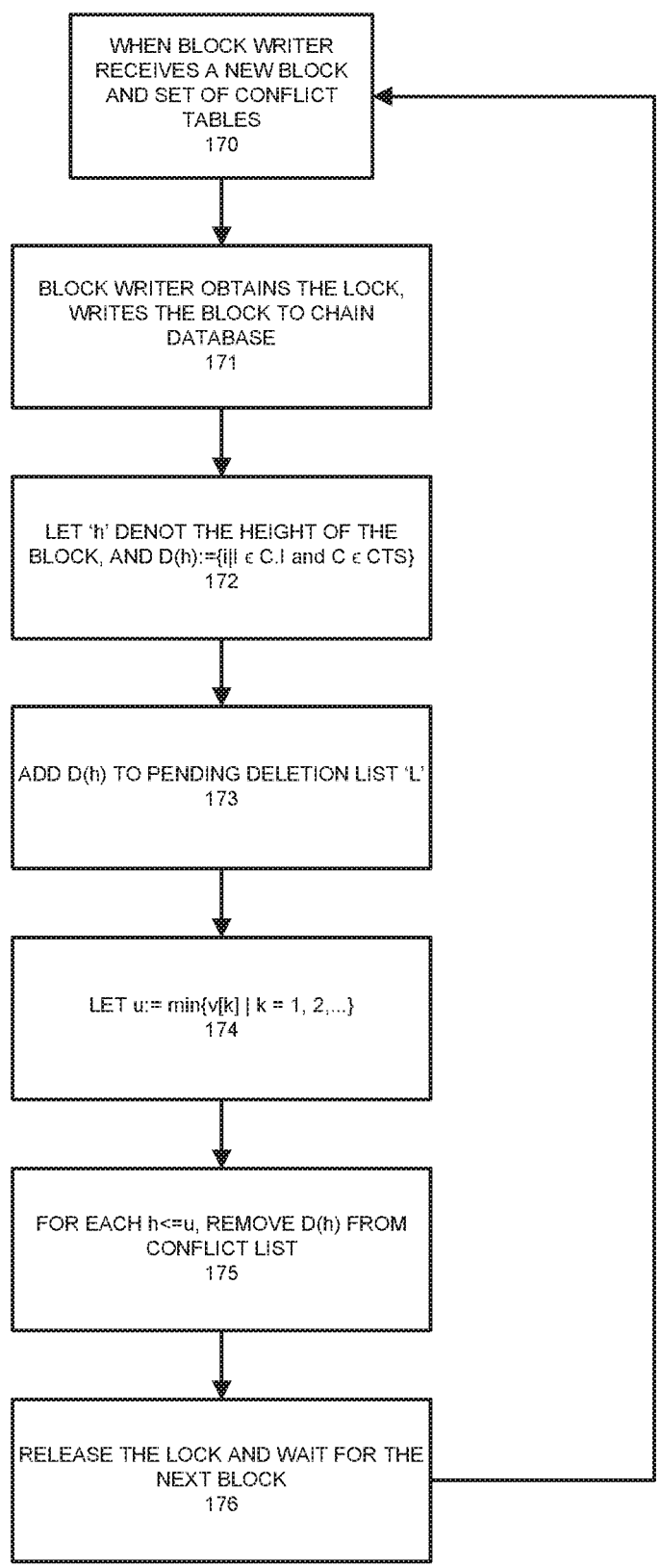
FIG. 1E illustrates still another logic diagram of a blockchain transaction management configuration of a block writer, according to example embodiments.

FIG. 1E illustrates still another logic diagram of a blockchain transaction management configuration of a block writer, according to example embodiments 100E. When block writer 170 receives a new block and a set of conflict tables CTS, the block writer 170 obtains the lock and writes the block to a chain database 171. Let 'h' denote the height of the block, and $D(h):=\{i|i \in C.I \text{ and } C \in CTS\}$ 172, then add $D(h)$ to a pending deletion list 'L' 173 and let $u:=\min\{v[k] \; k=1, 2, \ldots \}$ 174. For each $h<=u$, remove $D(h)$ from the conflict list 175, then release the lock and wait for the next block 176. The value 'k' is the ID of the transaction validator, and the transaction validator 'k' checks new transactions based on the blockchain state at height $v[k]$. Before the transaction validator 'k' checks a new transaction, it will read the current blockchain height and record the height as $v[k]$, and then the transaction validator 'k' will check the validity of the new transaction based on the blockchain state at height $v[k]$ or later. After the transaction validator 'k' checks a new transaction, it will set the $v[k]$ to null. The value $v[k]$ is used to deal with the conflict list. For example, transaction validator one first reads the blockchain height, for example, 200. It sets $v[1]:=200$. Then, the transaction validator one checks the validity of transaction TX based on the blockchain state at height 200 or later. The conflict list contains the 'I' set items of all the transactions that are checked as valid but have not been written to blockchain after the blockchain height of $\min(v[1], v[2], \ldots v[k])$. Thus, if transaction TX is valid based on a blockchain state at 200 (or later), and if transaction TX has no conflict with the conflict list (i.e., transaction TX has no conflicts with all the valid transactions from height$<=200$ until now), then transaction TX is valid and can be executed.

Figure 2A:
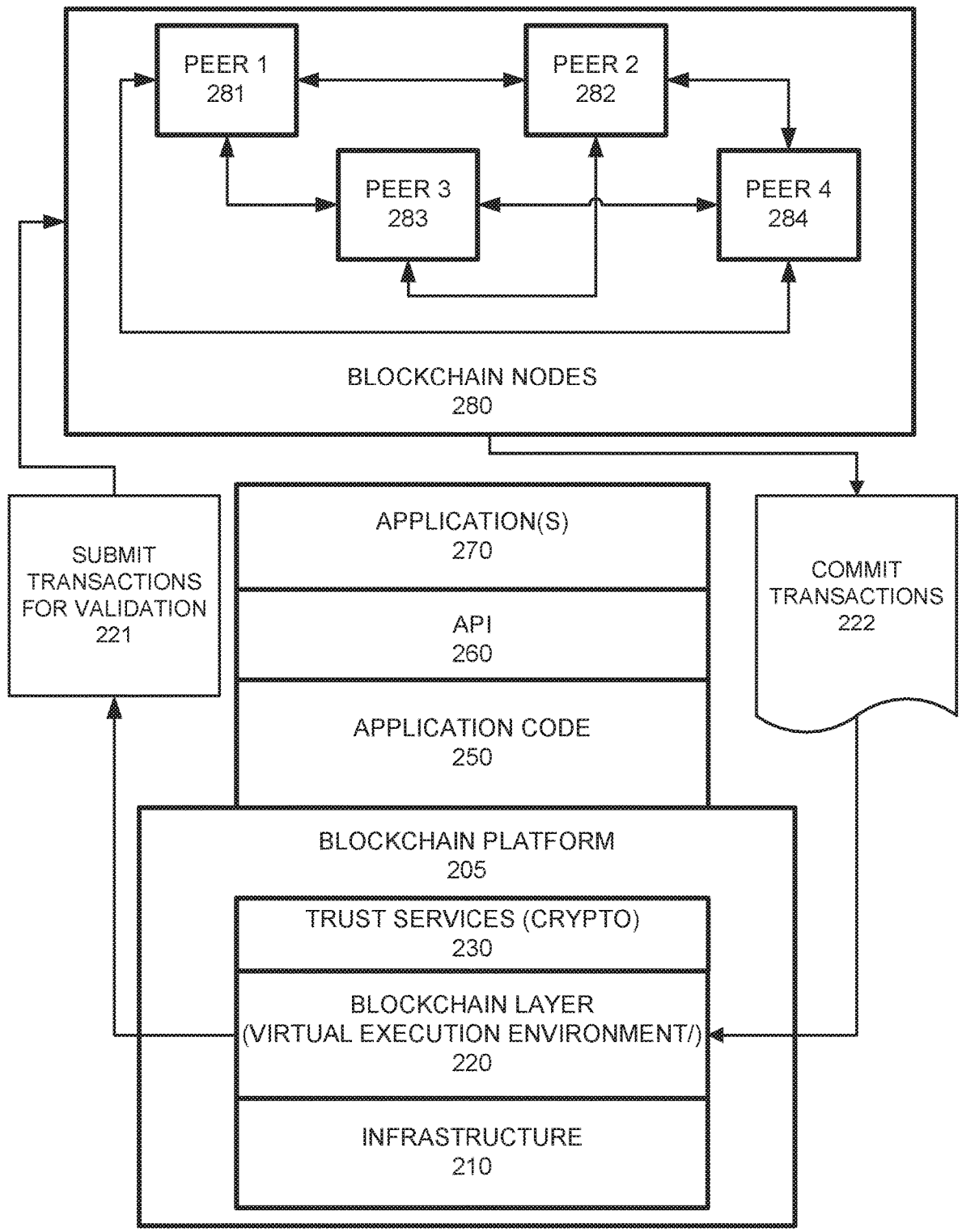
FIG. 2A illustrates an example peer node blockchain architecture configuration for managing blockchain transactions and blocks, according to example embodiments.

FIG. 2A illustrates a blockchain system architecture configuration 200A, according to example embodiments. Referring to FIG. 2A, blockchain architecture 200A may include certain blockchain elements, for example, a group 280 of blockchain nodes 281-284 which participate in blockchain transaction addition and validation process (consensus). One or more of the blockchain nodes 281-284 may endorse transactions and one or more blockchain nodes 281-284 may provide an ordering service for all blockchain nodes in the architecture 200A. A blockchain node may initiate a blockchain authentication and attempt to write to a blockchain immutable ledger stored in blockchain layer 220, a copy of which may also be stored on the underpinning physical infrastructure 210. The blockchain configuration may include one or more applications 270, which are linked to application programming interfaces (APIs) 260 to access and execute stored program/application code 250 (e.g., chaincode, smart contracts, etc.), which can be created according to a customized configuration sought by participants and can maintain their own state, control their own assets, and receive external information.

The blockchain base or platform 205 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain architecture configuration of FIG. 2A may process and execute program/application code 250 via one or more interfaces exposed, and services provided, by blockchain platform 205. The code 250 may control blockchain assets. For example, the code 250 can store and transfer data, and may be executed by nodes 281-284 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. In one example, transactions may be submitted 221 for validation to the blockchain nodes 280. The transactions 221 may be identified and committed 222 to the blockchain 220 once the validation procedure has been satisfied.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. In operation, the chaincode may receive a hash and retrieve from the blockchain a hash associated with the data template created by a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
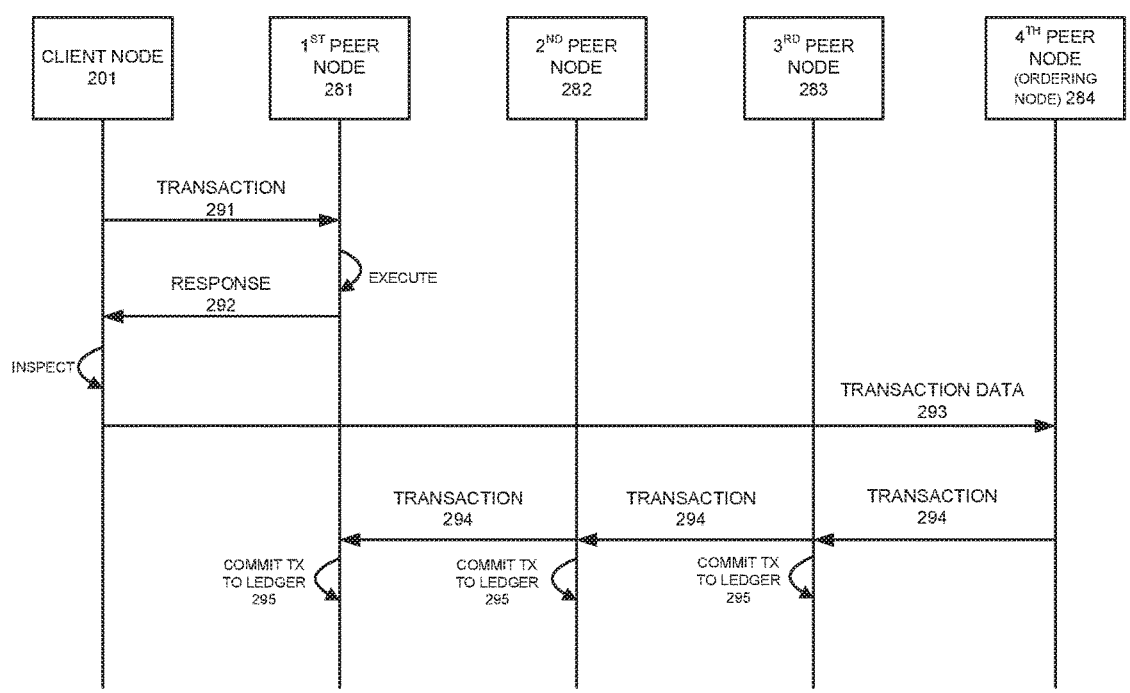
FIG. 2B illustrates an example peer node blockchain configuration, according to example embodiments.

FIG. 2B illustrates an example of a transactional flow 200B between nodes of the blockchain in accordance with an example embodiment. Referring to FIG. 2B, the transaction flow may include a transaction proposal 291 sent by an application client node 201 to an endorsing peer node 281. The endorsing peer 281 may verify the client signature and execute a chaincode function to simulate the transaction. The output may include the chaincode results, a set of key/value versions that were read in the chaincode (read set), and the set of keys/values that were written in chaincode (write set). The proposal response 292 is sent back to the client 201 along with an endorsement signature, if approved. The client 201 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 201 initiates the transaction 291 by constructing and sending a request to the peer node 281, which is an endorser. The client 201 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 201, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 201 which parses the payload for the application to consume.

In response, the application of the client 201 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 201 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
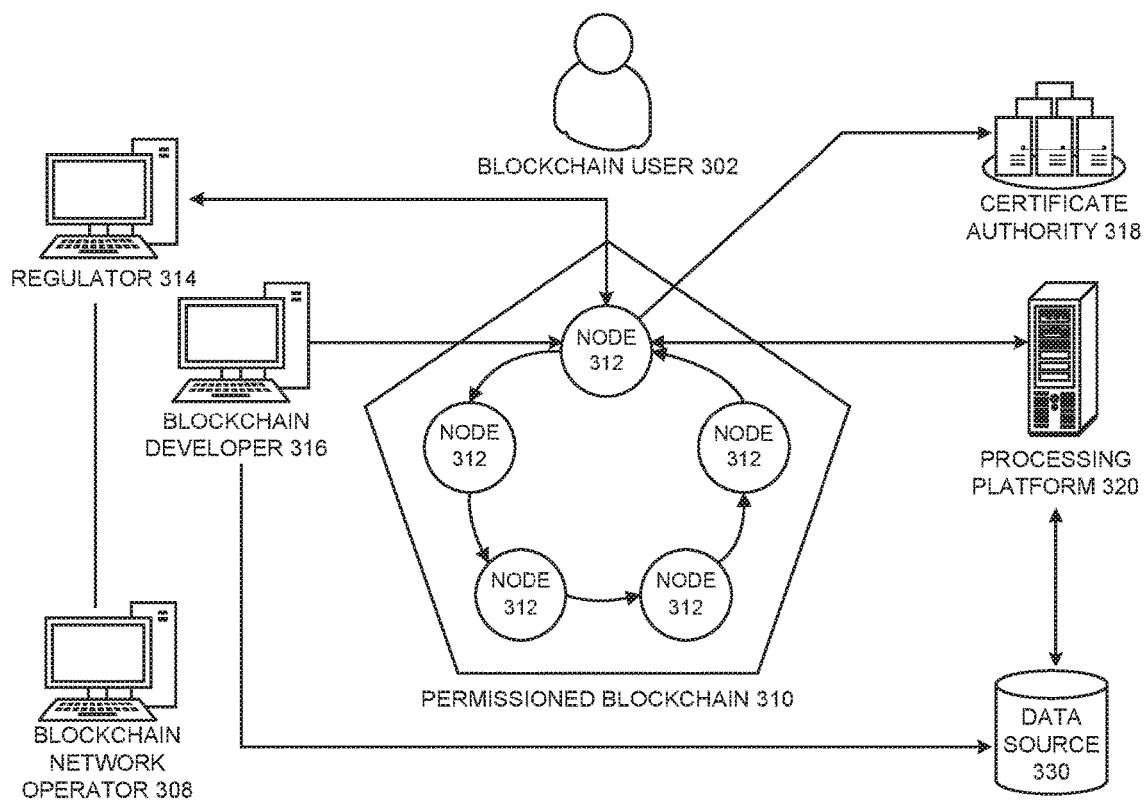
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator node 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
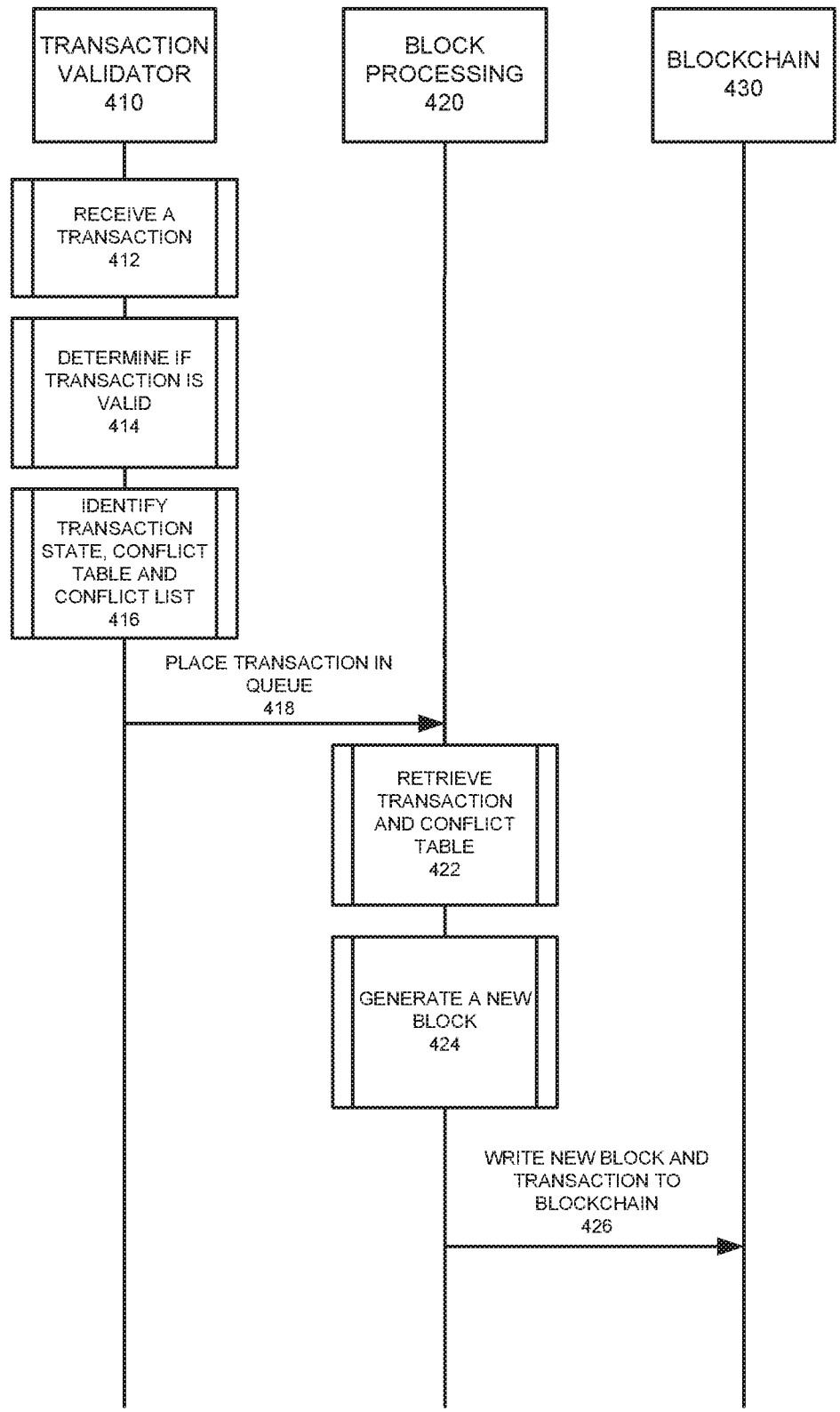
FIG. 4 illustrates a system messaging diagram for managing blockchain transactions and blocks, according to example embodiments.

FIG. 4 illustrates a system messaging diagram for managing blockchain transactions and blocks, according to example embodiments. Referring to FIG. 4, the configuration 400 includes a transaction validator 410, a block processing entity 420 and a blockchain 430. In one example method of operation, the validator 410 may receive a transaction 412 and determine if the transaction is valid 414. Other operations may include identifying a transaction state, conflict table and conflict list 416 to determine if the transaction is causing any conflicts at its current state in the processing queue. If the transaction is valid, the transaction may be moved to a processing queue 418. The block processing entity 420 may retrieve the transaction and the conflict table 422, generate a new block 424, if necessary, and submit the transaction/block to the blockchain 426.

Figure 5A:
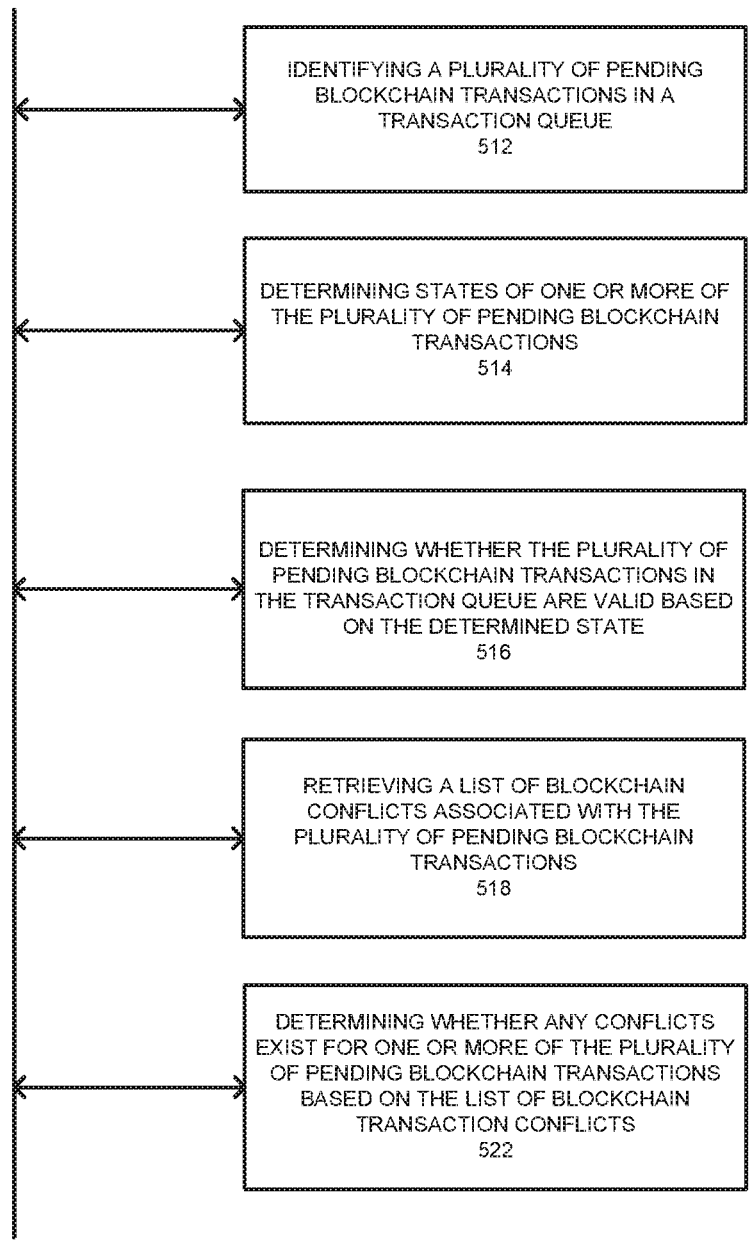
FIG. 5A illustrates a flow diagram of an example method of managing blockchain transactions and blocks, according to example embodiments.

FIG. 5A illustrates a flow diagram of an example method of managing blockchain transactions and blocks, according to example embodiments. Referring to FIG. 5A, the method 500A may include identifying a plurality of pending blockchain transactions in a transaction queue 512, determining a state of one or more of the plurality of pending blockchain transactions 514, determining whether the plurality of pending blockchain transactions in the transaction queue are valid based on the determined state 516, retrieving a list of blockchain transaction conflicts associated with the plurality of pending blockchain transactions 518, and determining whether any conflicts exits for the one or more pending blockchain transactions based on the list of blockchain transaction conflicts 522.

In the event that no conflicts exist for the one or more pending blockchain transactions, the method may provide adding the one or more pending blockchain transactions to a blockchain block. When one or more conflicts exist for the one or more pending blockchain transactions, the method may perform determining whether the one or more conflicts include temporary conflicts and permanent conflicts. When the one or more conflicts include any temporary conflicts, the method may perform postponing the adding of those one or more conflicts to a blockchain block. When the one or more conflicts include any permanent conflicts, the method may also include invalidating the one or more pending blockchain transactions which have permanent conflicts, and the method may also include updating the list to remove the pending blockchain transactions which have been added to the blockchain block. The method may also include determining whether the plurality of pending blockchain transactions in the transaction queue are valid based on the determined state, and when the plurality of pending blockchain transactions are deemed valid, moving the pending blockchain transactions to a validated transaction queue prior to determining whether any conflicts exits for the one or more pending blockchain transactions based on the list of blockchain transaction conflicts.

Figure 5B:
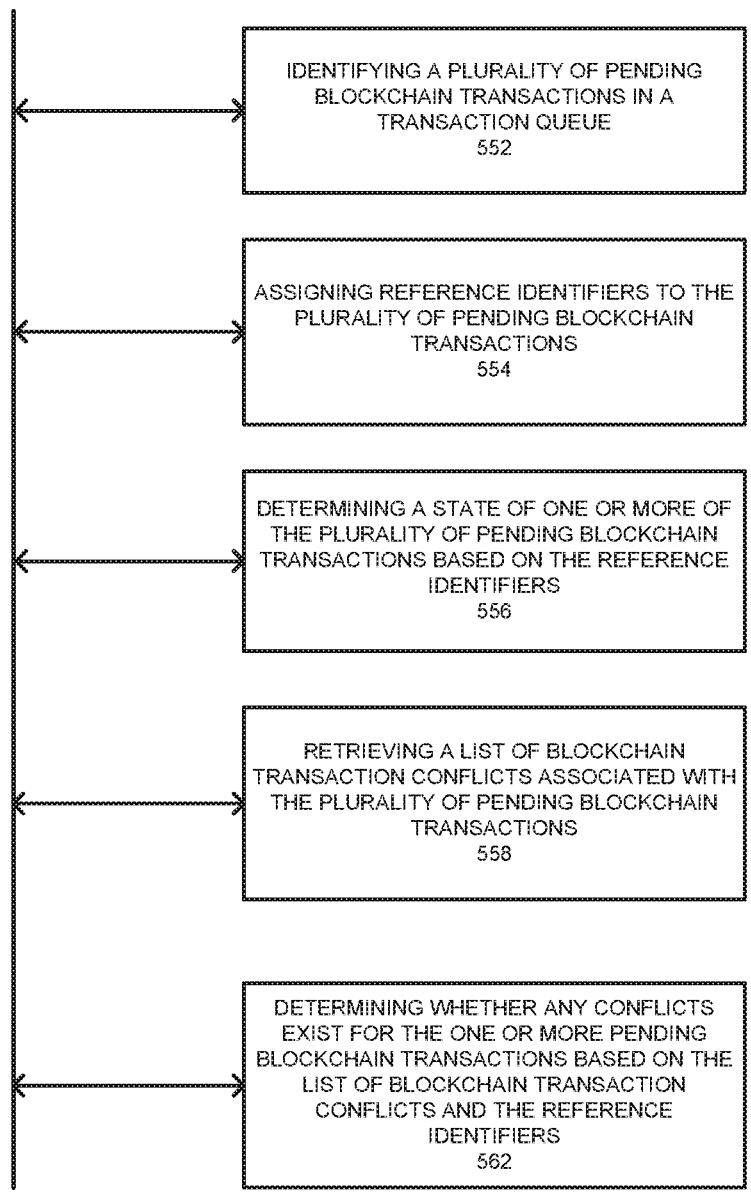
FIG. 5B illustrates a flow diagram of another example method of managing blockchain transactions and blocks, according to example embodiments.

FIG. 5B illustrates a flow diagram of another example method of managing blockchain transactions and blocks, according to example embodiments. Referring to FIG. 5B, the method 500B may include identifying a plurality of pending blockchain transactions in a transaction queue 552, assigning reference identifiers to the plurality of pending blockchain transactions 554, determining a state of one or more of the plurality of pending blockchain transactions based on the reference identifiers 556, retrieving a list of blockchain transaction conflicts associated with the plurality of pending blockchain transactions 558, and determining whether any conflicts exist for the one or more pending blockchain transactions based on the list of blockchain transaction conflicts and the reference identifiers 562.

In addition to just relying on conflict information, the transactions may each have a unique reference identifier which provides a reliable reference used to identify the transactions when they appear in the queue. The references may provide a placeholder or sequence to identify a date or time a transaction appears. The reference may then be used to determine whether the transaction is ahead or behind other transactions. This may be determined based on the last transaction identified in the queue and the next transaction identified in the queue having their reference identifiers being compared to the current transaction's reference identifier. This provides a sequence check to determine if the order of transactions is correct.

Figure 6A:
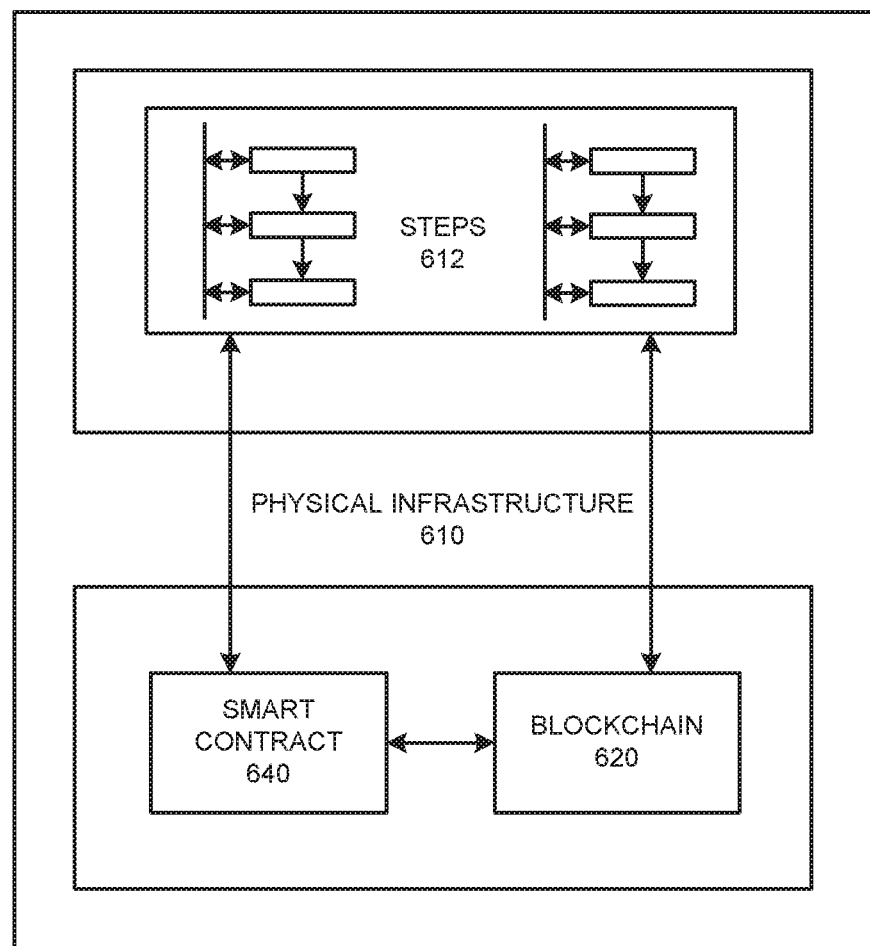
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
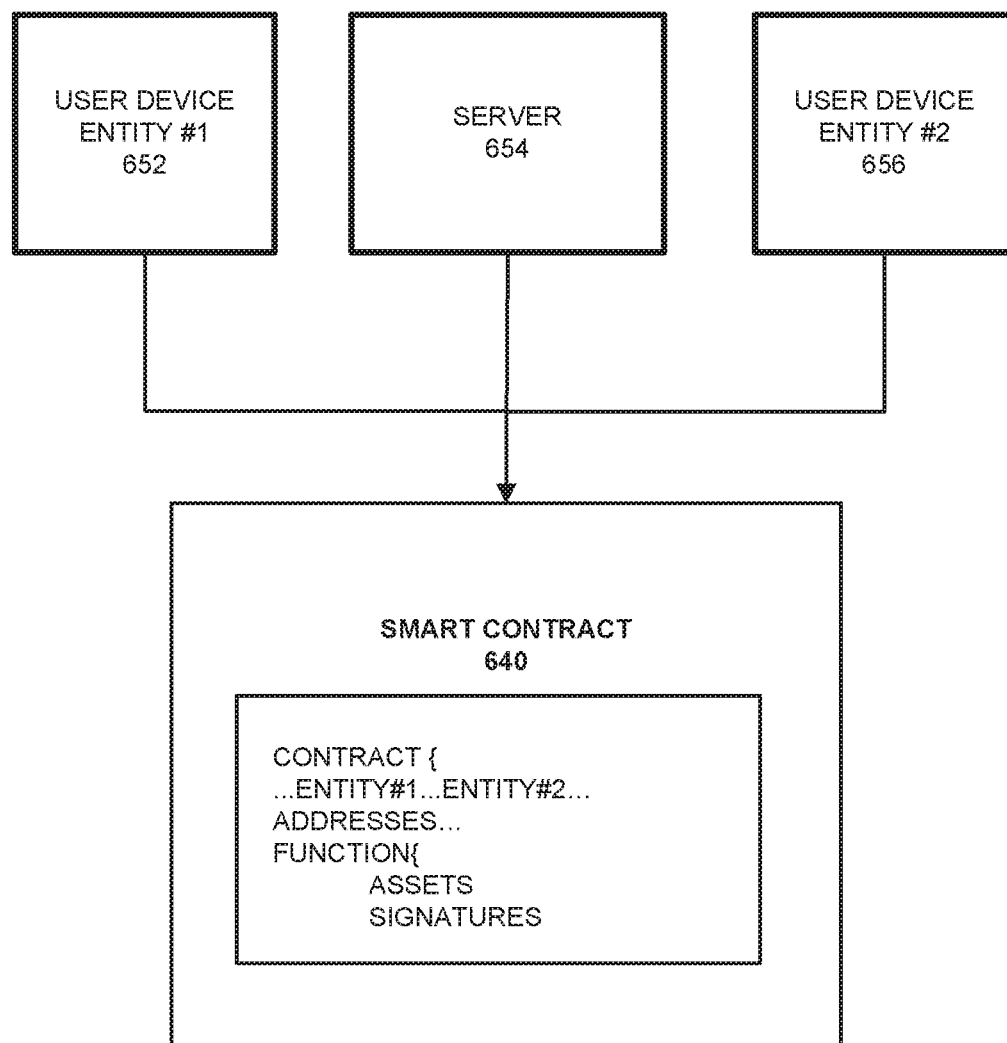
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 600B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
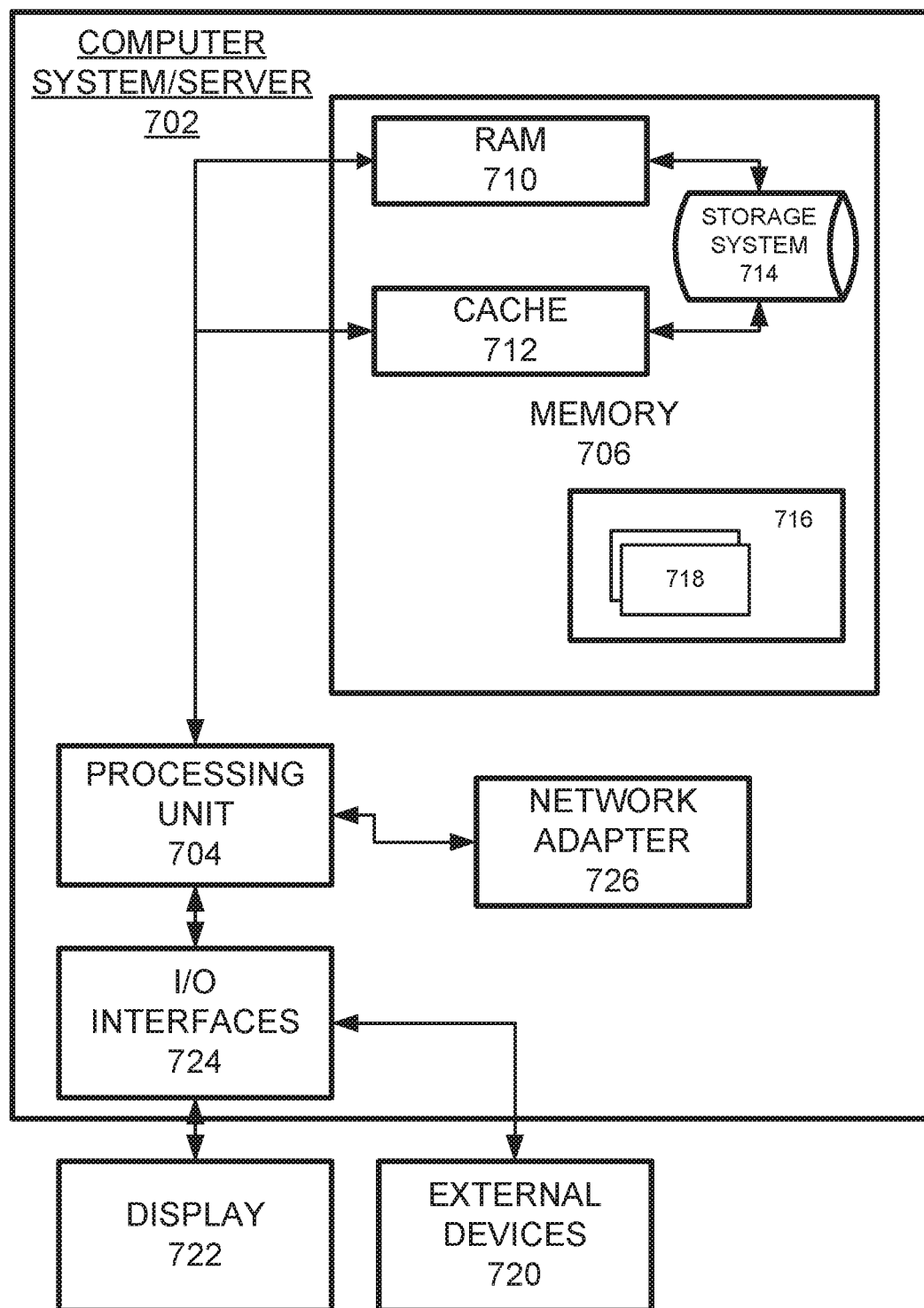
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   validating a plurality of pending blockchain transactions in a transaction queue based on states of the plurality of pending blockchain transactions;
   identifying a pending blockchain transaction in the transaction queue that includes a conflict with another pending blockchain transaction in the transaction queue based on a conflict table of the pending blockchain transaction and a conflict table of the another pending blockchain transaction;
   determining that a validity of the pending blockchain transaction cannot yet be resolved based on a location of a conflicting item of the pending blockchain transaction within the conflict table of the pending blockchain transaction; and
   postponing a validity determination of the pending blockchain transaction that includes the conflict to a later time.

2. The method of claim 1, further comprising adding one or more of the plurality of pending blockchain transactions that do not comprise conflicts to a blockchain block.

3. The method of claim 1, further comprising re-validating the postponed pending blockchain transaction that includes the conflict at the later time.

4. The method of claim 1, wherein the validating comprises validating the plurality of pending blockchain transactions in parallel with one another.

5. The method of claim 1, further comprising invalidating one or more of the plurality of pending blockchain transactions that comprise permanent conflicts.

6. The method of claim 2, further comprising:
removing one or more of the plurality of pending blockchain transactions from a conflict list which have been added to the blockchain block.

7. The method of claim 1, further comprising:
generating a conflict list which distinguishes temporary conflicts from permanent conflicts among the plurality of pending blockchain transactions.

8. A system, comprising:
a processor configured to
validate a plurality of pending blockchain transactions in a transaction queue based on states of the plurality of pending blockchain transactions;
identify a pending blockchain transaction that includes a conflict with another pending blockchain transaction in the transaction queue based on a conflict table of the pending blockchain transaction and a conflict table of the another pending blockchain transaction;
determine that a validity of the pending blockchain transaction cannot yet be resolved based on a location of a conflicting item of the pending blockchain transaction within the conflict table of the pending blockchain transaction; and
postpone a validity determination of the pending blockchain transaction that includes the conflict to a later time.

9. The system of claim 8, wherein the processor is further configured to add one or more of the plurality of pending blockchain transactions that do not comprise conflicts to a blockchain block.

10. The system of claim 8, wherein the processor is further configured to re-validate the postponed pending blockchain transaction that includes the conflict at the later time.

11. The system of claim 8, wherein the processor is configured to validate the plurality of pending blockchain transactions in parallel with one another.

12. The system of claim 8, wherein the processor is further configured to invalidate one or more of the plurality of pending blockchain transactions that comprise permanent conflicts.

13. The system of claim 9, wherein the processor is further configured to remove one or more of the plurality of pending blockchain transactions from a conflict list which have been added to the blockchain block.

14. The system of claim 8, wherein the processor is further configured to generate a conflict list which distinguishes temporary conflicts from permanent conflicts among the plurality of pending blockchain transactions.

15. A non-transitory computer readable storage medium configured to store instructions that when executed cause a processor to perform a method comprising:
validating a plurality of pending blockchain transactions in a transaction queue based on states of the plurality of pending blockchain transactions;
identifying a pending blockchain transaction in the transaction queue that includes a conflict with another pending blockchain transaction in the transaction queue based on a conflict table of the pending blockchain transaction and a conflict table of the another pending blockchain transaction;
determining that a validity of the pending blockchain transaction cannot yet be resolved based on a location of a conflicting item of the pending blockchain transaction within the conflict table of the pending blockchain transaction; and
postponing a validity determination of the pending blockchain transaction that includes the conflict to a later time.

16. The non-transitory computer readable storage medium of claim 15, wherein the method further comprises adding one or more of the plurality of pending blockchain transactions that do not comprise conflicts to a blockchain block.

17. The non-transitory computer readable storage medium of claim 15, wherein the method further comprises re-validating the postponed pending blockchain transaction that includes the conflict at the later time.

18. The non-transitory computer readable storage medium of claim 17, wherein the validating comprises validating the plurality of pending blockchain transactions in parallel with one another.

19. The non-transitory computer readable storage medium of claim 17, wherein the method further comprises removing one or more of the plurality of pending blockchain transactions from a conflict list which have been added to the blockchain block.

20. The non-transitory computer readable storage medium of claim 15, wherein the method further comprises generating a conflict list which distinguishes temporary conflicts from permanent conflicts among the plurality of pending blockchain transactions.

* * * * *